Patented June 18, 1940

2,204,959

UNITED STATES PATENT OFFICE 2,204,959

SINTERED BINDING AGENT OF THE PORTLAND CEMENT TYPE AND PROCESS FOR MANUFACTURING SAME

Gerhard Frenkel, Rudersdorf, near Berlin, Germany

No Drawing. Application July 19, 1938, Serial No. 220,154. In Germany July 19, 1937

12 Claims. (Cl. 106—25)

The present invention relates to a sintered binding agent of the Portland cement type, and process for manufacturing same. For the purpose of explaining the invention and appreciating the technical advantages connected therewith, it may be pointed out that, when manufacturing the raw mixture of Portland cement or cement in general, the quantity of the ingredients is given in proportion of weights.

The four main ingredients of Portland cement consist, as is well known, of lime (CaO), silica ($SiO_2$), alumina ($Al_2O_3$), and ferric oxide ($Fe_2O_3$). For the purpose of judging the kind of mixture, the proportion of the content of lime to the sum of the contents of silica, alumina and ferric oxide $$\frac{CaO}{SiO_2+Al_2O_3+Fe_2O_3}$$

has been called hydraulic modulus. Later on, the designation silicate modulus has been introduced for the proportion of silica to the total quantity of alumina and ferric oxide $$\frac{SiO_2}{Al_2O_3+Fe_2O_3}$$

while, for the proportion of alumina to ferric oxide $$\frac{Al_2O_3}{Fe_2O_3}$$

the designation alumina modulus has been introduced.

From the proportion of mixture of the raw stuffs on the basis of certain numerical values for these moduli, the properties of the cement manufactured from the raw mixture will result.

The modern method of building with concrete requires cements, which, in addition to high tensile, compressive and transverse strengths, both in the beginning of the hardening process and its later course, show a good plasticity in mixing, a low demand for water, a development of heat, which is as low as possible, when setting, a low modulus of elasticity and a tendency to shrinkage, which is as low as possible.

In order to comply with these requirements, the process formerly recommended by Ferrari, an Italian subject, has been taken up partly in literature and partly in foreign practice, according to which the ferric oxide, contained in the cement, should be so high that the whole quantity contained in the aluminate is bound as tetracalcium aluminoferrite ($4CaO.Al_2O_3.Fe_2O_3$), in contradistinction to the usual kinds of Portland cement, in which, in addition to this combination, pure calcium aluminates are present. The proportion of weight of $$\frac{alumina}{ferric\ oxide}=\frac{Al_2O_3}{Fe_2O_3}$$

must in this case be 0.64 in these Ferrari cements, corresponding to the proportion of the molecular weight of these two components. On that supposition, calcium aluminates are to be made responsible both for the considerable shrinkage and a high setting heat.

Attention has also been drawn to the advantages of the Ferrari principle, on the basis of which a cement has been developed, which is composed as follows:

The silicate modulus, i. e. the proportion $$\frac{silica}{alumina+ferric\ oxide}=\frac{SiO_2}{Al_2O_3+Fe_2O_3}$$

between 1.10 and 1.75 shall preferably lie at 1.40, whilst the alumina modulus, i. e. the proportion $$\frac{alumina}{ferric\ oxide}=\frac{Al_2O_3}{Fe_2O_3}$$

between 0.90 and 0.45 shall preferably lie at 0.64. Consequently, this process is distinguished from the Ferrari process merely in so far as in the former process, the silicate modulus is artificially reduced to a considerable extent.

However, cements of the combination recommended have drawbacks both in the manufacture and in the working, thereby making the application of the process questionable.

In the first place, difficulties are experienced when burning the cement, the material to be burnt having a strong tendency to melt, thereby sticking fast in the kiln. The troubles, caused thereby, will occur all the more with the reduction of the modulus within the limits resulting from the proposal made. Owing to the melting process, which can practically never be avoided in these mixtures, a very dense cement clinker is produced, the grinding of which offers considerable difficulties. An additional disadvantage in the manufacture results from the high costs of raw materials connected with the considerable additions of ferric oxide, inasmuch as, for the purpose of obtaining an alumina modulus of 0.64 or a still lower modulus, very pure iron ores have to be added, which are now scarcely at disposal for this purpose.

In working these cements, the alumina modulus of which lies at 0.64 or below, they show a comparatively sluggish initial hardening, so that they can no longer be regarded as highly valuable cements.

The inventor has found that all these drawbacks can be obviated by combining the cement in such a manner that its silicate modulus lies between 1.75 and 2.00, preferably at 1.90, and that its alumina modulus lies between 0.70 and 0.90, preferably at 0.80. Various cements of this composition have but little tendency to melt, so that they guarantee a perfect operation of the kiln and the burning of a well sintered but still unmolten and extraordinarily brittle clinker, which can, therefore, be easily ground. Owing to the intended very slight increase of the alumina modulus over and above the equivalency proportion of 0.64, the presence of small quantities of free aluminate ions is also guaranteed, which will strongly influence the hardening process, without, however, having an injurious effect on the shrinking property of the cement in view of their weak concentration.

The present invention has at the same time for its object to produce a raw mixture of cement with the characteristic feature that only a small number of additional materials are required. This offers the technical and economical advantage that the working methods for the mixing process are greatly simplified.

It has not only been possible to fix this process in this manner in a theoretical way, but, in view of the present scarcity of iron, to find also a suitable method for carrying out the process on a large scale, in connection with which the selection of the lime stone on the one hand and that of the iron oxide carrier is of considerable importance.

As regards the lime carrier, according to the invention a sort of lime stone is preferably used, which, in addition to carbonate of lime, contains also silica of a quantity of about 10% and sesquioxide in quantities of about 3-5%. This sort of lime stone may be called briefly wave-lime. In accordance with the invention, instead of the normal ferric oxide component, a red iron stone is used, which, besides its comparatively low content of ferric oxide, viz. about 32-40%, still contains so much silica and alumina that, when mixing it with the wave-lime and under certain circumstances by adding sand-flour of about 2% of the total mixture, guarantees the combination of the raw mixture for the most desirable properties of the binding medium to be produced. This will have the effect that the alumina modulus and the silicate modulus conforms to the limits mentioned. By this means, the most important idea of the invention, which has already been more clearly described, is realized, so that a cement is produced, whose main quantity of alumina is bound in the form of tetracalcium alumino-ferrite, but which,—and this is the most important point—contains a low percentage of free aluminate ions (originating from tricalcium aluminate), whereby the hardening process is strongly influenced, without, however appreciably increasing the shrinking property of the cement. Furthermore, the content of silica in such a cement is such that the clinker can be burned free from any trouble and that it can be easily ground.

As regards the ferric oxide carrier as an additional material, a strong gangue-containing German iron ore has been found, which contains all hydraulic factors in a quantity necessary for determining the raw flour, besides showing such a low content of ferric oxide that, at present, it does not come into consideration for the metallurgical treatment of iron. On the contrary, large quantities of ore, containing but little iron, had to be moved within the last few years, for the purpose of working ore which is rich in iron and ready for smelting, and which had to be thrown on the dump, but which can now be utilized commercially for the manufacture of the new cement. By this means, the working of iron ore involved is not only rendered more economical, but new possibilities are offered in the future for extracting ore deposits, the working of which has hitherto not been profitable.

The content of silica necessary for convenient grinding, i. e. for a brittle clinker, might also be produced artificially, for instance by adding a different iron ore containing a still larger quantity of sand flour. By using red iron ore of the kind described, containing but little ferric oxide, we have the advantage—which must not be underestimated—that in that case the silica is added either wholly or for the most part to the raw mixture in a form made available by nature in an abundant quantity, which has a great influence on the combustibility and properties of the burnt cement and cannot be attained by artificial mixture.

As a matter of course, the advantages described above, resulting from the use of a red iron ore containing but little oxide, will act in the same manner, if no lime marl of the kind described (wave-lime) is at disposal as an initial material, but if lime stone and clay is used as an initial material of the raw mixture, as is the case in most cement factories.

The wave-lime, described above, has the advantage that the quantities of lime, silica and sesquioxide, attainable by artificial mixture of lime stone with clay in other refractories, are already supplied by a single natural material. When using wave lime and also when using lime stone and clay, the same advantage is attained by an addition of the above mentioned red iron ore which contains but little oxide, in so far as no sand flour at all or only a very small addition of sand flour (not exceeding 2%), or of other materials containing silica is necessary, in order to obtain the desired combination of the raw mixture with regard to the silica, while, by using any other ferric oxide carrier (for instance a different ore or purple ore), the addition of considerable quantities of one or several additional raw materials, such as sand, clay, slag or other materials containing silica is indispensable, since these iron carriers are not so favourably combined by nature.

With a cement of the new combination, it is in the first place possible, to accentuate the low shrinking property, to a considerable extent. The following table, in which the testing results, obtained with the new cement are compared with those of some sorts of Portland cements or road making cements, may serve as an illustration.

|  | Transverse strength (Kg./cm.²) | | | | | Compressive strength plastic (Kg./cm²) | | | | | Shrinkage (Mm./m.) | | |
|---|---|---|---|---|---|---|---|---|---|---|---|---|---|
| Age (days) | 1 | 3 | 7 | 28* | 28** | 1 | 3 | 7 | 28* | 28** | 28 | 56 | 90 |
| Cement according to the invention | 24 | 53 | 67 | 86 | 74 | 99 | 293 | 431 | 559 | 622 | 0.22 | 0.41 | 0.49 |
| Road making cement No. 1 | 15 | 38 | 51 | 68 | 83 | 61 | 183 | 305 | 437 | 456 | 0.50 | 0.61 | 0.62 |
| Road making cement No. 2 | 18 | 41 | 55 | 76 | 92 | 62 | 188 | 289 | 479 | 534 | 0.56 | 0.68 | 0.70 |
| Portland cement No. 1 | 6 | 23 | 37 | 59 | 63 | 21 | 92 | 161 | 350 | 353 | 0.50 | 0.80 | 0.83 |
| Portland cement No. 2 | 14 | 33 | 49 | 64 | 74 | 46 | 148 | 251 | 451 | 475 | 0.44 | 0.79 | 0.86 |

\* Water bed. \*\* Unit bed.

In the table given above, the figures for transverse strength and plastic compressive strength have also been included, from which it can be seen that, in accordance with the invention, the cement is superior to the sorts of Portland cements and road making cements, which have been compared. Its values attain about those of cements of high and specially high value. It has hitherto not been possible in any case to obtain such a low tendency to shrinkage simultaneously with such a high transverse strength and compressive strength, so that, in case of the so-called cements of high and especially high value, either a considerable tendency to shrinkage had to be admitted, or the main value was attached to a moderate tendency to shrinkage, so that one had to be content with comparatively low figures relating to the strength (road making cements).

Owing to its very low shrinkage property, in connection with high figures relating to strength, the new cement is more fit for covering concrete roads and as a binding agent for the concrete goods industry than all other cements.

As an additional very important improvement, the high plasticity of the new cement may be mentioned, which, in connection with a very low demand for water, enables the manufacture of a comparatively dry and well working pliable concrete mixture.

Owing to the exclusion of the calcium aluminates, the new cement shows a very low development of heat in setting, so that, in connection with the high figures relating to strength and its low tendency to shrinkage, it represents a first class binding agent for wholesale concrete (works of fortification, flood-dikes etc.).

Finally, the new cement—likewise owing to the absence of larger quantities of calcium aluminates—possesses a far greater resisting force against attacks of sulphatic ground water than all other common sorts of Portland cement.

In cooperation with all the advantages mentioned above, the new cement, therefore, represents an ideal standard binding agent.

Finally, the following example will show in what manner a cement within the meaning of the present invention is composed, viz. a cement, which shows the most favourable combination both for the silicate modulus and the alumina modulus, and with which the lime standard can be brought up to roughly 100.

| | |
|---|---|
| Silica | 19.10 |
| Alumina | 4.47 |
| Ferric oxide | 5.58 |
| Lime | 62.28 |
| Magnesia | 2.90 |
| Gypsum | 5.00 |
| Loss due to glowing, and insoluble substances | 0.67 |
| Alumina modulus | 0.80 |
| Silicate modulus | 1.90 |

I claim:

1. Method of forming a sintered binding agent with a carbonate of lime content of the Portland cement type characterized by high strength and low shrinkage, which comprises preparing a raw mixture containing limestone and iron ore, said mixture having as components silica, alumina, and iron oxide adjusted to a silicate modulus between 1.75 and 2.00, the content of alumina being adjusted to an alumina modulus between 0.70 and 0.90, and sintering said mixture.

2. Method of forming a sintered binding agent with a carbonate of lime content of the Portland cement type characterized by high strength and low shrinkage, which comprises preparing a raw mixture containing limestone and iron ore, said mixture having as components silica, alumina, and iron oxide adjusted to a silicate modulus of approximately 1.90, the content of alumina being adjusted to an alumina modulus of approximately 0.80, and sintering said mixture.

3. Method of forming a sintered binding agent with a carbonate of lime content of the Portland cement type characterized by high strength and low shrinkage, which comprises preparing a raw mixture of a lime carrier and an iron oxide carrier, the lime carrier being a limestone which, in addition to carbonate of lime, contains 8–11% of silica and 3–6% of sesquioxides, the iron oxide carrier being a red iron ore which, in addition to a low content of about 32–40% iron oxide, contains 40–50% silica, 3–5% alumina, and 2–5% lime, the proportions being such that the silicate modulus of the raw mixture is adjusted to between 1.75 and 2.00 and the alumina modulus is adjusted to between 0.70 and 0.90, and sintering said mixture.

4. Method of forming a sintered binding agent with a carbonate of lime content of the Portland cement type characterized by high strength and low shrinkage, which comprises preparing a raw mixture of a lime carrier and an iron oxide carrier, the lime carrier being a limestone which, in addition to carbonate of lime, contains 8–11% of silica and 3–6% of sesquioxides, the iron oxide carrier being a red iron ore which, in addition to a low content of about 32–40% iron oxide, contains 40–50% silica, 3–5% alumina, and 2.5% lime, the proportions being such that the silicate modulus of the raw mixture is adjusted to approximately 1.90 and the alumina modulus is adjusted to approximately 0.80, and sintering said mixture.

5. Method of forming a sintered binding agent with a carbonate of lime content of the Portland cement type characterized by high strength and low shrinkage, which comprises preparing a raw mixture of a limestone which, in addition to carbonate of lime, contains 8–11% of silica and 3–6% of sesquioxides, red iron ore, and other silica containing material, so proportioned as to adjust the silicate modulus of the raw mixture to between 1.75 and 2.00, and the alumina modulus to between 0.70 and 0.90, and sintering said mixture.

6. Method of forming a sintered binding agent with a carbonate of lime content of the Portland cement type characterized by high strength and low shrinkage, which comprises preparing a raw mixture of a limestone which, in addition to carbonate of lime, contains 8-11% of silica and 3-6% of sesquioxides, red iron ore, and other silica containing material, so proportioned as to adjust the silicate modulus of the raw mixture to approximately 1.90, and the alumina modulus to approximately 0.80, and sintering said mixture.

7. The method described in claim 1, wherein the sintered mixture is ground with an addition of 4-6% of gypsum.

8. The method described in claim 2, wherein the sintered mixture is ground with an addition of 4-6% of gypsum.

9. A sintered binding agent of the Portland cement type, the silicate modulus of which lies between 1.75 and 2.00, and the alumina modulus of which lies between 0.70 and 0.90.

10. A sintered binding agent of the Portland cement type, the silicate modulus of which is approximately 1.90, and the alumina modulus of which is approximately 0.80.

11. A binding agent of the Portland cement type, comprising a ground mixture of 4-6% gypsum with a clinker having a silicate modulus which lies between 1.75 and 2.00, and an alumina modulus which lies between 0.70 and 0.90.

12. A binding agent of the Portland cement type, comprising a ground mixture of 4-6% gypsum with a clinker having a silicate modulus of approximately 1.90, and an alumina modulus of approximately 0.80.

GERHARD FRENKEL.